United States Patent
Reed et al.

(10) Patent No.: US 6,714,144 B1
(45) Date of Patent: Mar. 30, 2004

(54) DATA RANDOMIZATION IN A DATA STORAGE SYSTEM

(75) Inventors: David E. Reed, Westminster, CO (US); Jay N. Livingston, Superior, CO (US); Marvin L. Vis, Longmont, CO (US)

(73) Assignee: Cirrus Logic, Inc., Austin, TX (US)

( * ) Notice: Subject to any disclaimer, the term of this patent is extended or adjusted under 35 U.S.C. 154(b) by 584 days.

(21) Appl. No.: 09/694,583

(22) Filed: Oct. 23, 2000

(51) Int. Cl.[7] ................................................. H03M 7/00
(52) U.S. Cl. ........................................................ 341/50
(58) Field of Search ............................. 341/51, 89, 94, 341/109, 54

(56) References Cited

U.S. PATENT DOCUMENTS

| | | | |
|---|---|---|---|
| 4,771,429 A | * 9/1988 | Davis | .......................... 371/27 |
| 4,978,955 A | 12/1990 | Howell | |
| 4,993,029 A | 2/1991 | Galbraith et al. | |
| 5,570,307 A | 10/1996 | Takahashi | |
| 5,712,863 A | 1/1998 | Gray | |
| 5,745,522 A | 4/1998 | Heegard | |
| 5,844,509 A | 12/1998 | Behrens et al. | |
| 5,931,968 A | 8/1999 | Gray | |
| 6,009,550 A | 12/1999 | Gosula et al. | |
| 6,032,284 A | 2/2000 | Bliss | |
| 6,052,815 A | 4/2000 | Zook | |
| 6,052,817 A | 4/2000 | Whaley | |

* cited by examiner

*Primary Examiner*—Brian Young
(74) *Attorney, Agent, or Firm*—Duft Setter Ollila & Bornsen LLC

(57) ABSTRACT

Data storage system circuitry comprises randomizer circuitry and grading circuitry. The randomizer circuitry concurrently generates multiple randomized versions of user data. The grading circuitry selects one of the multiple randomized versions of the user data for data storage. Decoding circuitry decodes the selected one of the multiple randomized versions of the user data. In some examples of the invention, the grading circuitry selects the one of the multiple randomized versions of the user data based on zero run characteristics of the multiple randomized versions of the user data. In some examples of the invention, the user data is not encoded with a run length limit algorithm.

24 Claims, 5 Drawing Sheets

DATA RANDOMIZATION IN A DATA STORAGE SYSTEM

BACKGROUND OF THE INVENTION

1. Field of the Invention

The invention is related to the field of data storage systems, and in particular, to the randomization and grading of user data to improve system performance.

2. Statement of the Problem

Data storage systems include disk drives and tape drives. These storage drives encode user data and then write the encoded user data to storage media. When the data is later requested, the drive reads the encoded user data from the storage media and recovers the user data through a reciprocal decoding technique. Encoding often entails the conversion of user data into a series of transitions that are written to a disk or tape. For example, a transition may represent a "one", and a lack of a transition may represent a "zero". Some common encoding techniques are Non-Return to Zero Inverted (NRZI) and Partial Response Four (PR4).

In some cases, the encoded user data includes a string of zeros that are represented by a flat signal with no transitions. This lack of transitions creates timing and gain problems when recovering the user data. To relieve this problem, Run Length Limit (RLL) algorithms are used during the encoding process to systematically replace strings of zeros with special codes that include some transitions. Although RLL encoding improves timing and gain performance, it also requires additional bandwidth to carry RLL overhead information. This RLL bandwidth usage lowers the storage capacity of the data storage system.

Randomization is an encoding process where the user data is altered based on a numerical pattern that repeats over time. Randomization tends to reduce the length of zero runs, and thus, reduces the need for RLL encoding. Typically, a Linear Feedback Shift Register (LFSR) generates the numerical pattern based on a numerical seed that is initially stored in the LFSR. Unfortunately, the use of randomization has not been effectively implemented to significantly reduce and possibly eliminate the need for RLL encoding. As a result, bandwidth remains committed to RLL overhead. This loss of bandwidth lowers the storage capacity of the data storage system.

SUMMARY OF THE SOLUTION

The invention solves the above problems with circuitry that effectively uses randomization to significantly reduce, or even eliminate, the need for RLL encoding. As a result, the circuitry reduces or eliminates the bandwidth required for RLL encoding. This bandwidth savings increases the storage capacity of the data storage system.

In some examples of the invention, data storage system circuitry comprises randomizer circuitry and grading circuitry. The randomizer circuitry concurrently generates multiple randomized versions of the user data. The grading circuitry selects one of the multiple randomized versions of the user data for data storage. During user data retrieval, decoding circuitry decodes the selected randomized version of the user data. In some examples of the invention, the grading circuitry selects the selected randomized version of the user data based on zero run characteristics. In some examples of the invention, the user data is not encoded with an RLL algorithm.

In some examples of the invention, the randomizer circuitry concurrently generates multiple numbers and uses the multiple numbers to concurrently generate the multiple randomized versions of the user data. The randomizer circuitry may comprise a Feedback Shift Register (FSR) that generates a numerical pattern and phase circuitry that concurrently generates different phases of the numerical pattern to concurrently generate the multiple numbers. In some examples of the invention, the grading circuitry encodes a key and an associated error correction code into the selected randomized version of the user data. The key indicates one of the numbers used to randomize the selected randomized version of the user data.

In some examples of the invention, the data storage system circuitry comprises disk drive system circuitry. The disk drive system circuitry comprises randomizer circuitry and grading circuitry. The randomizer circuitry generates multiple randomized versions of each of the blocks in a data sector. The grading circuitry selects from the randomized versions of the blocks based on zero run characteristics to form a selected randomized version of the data sector. The grading circuitry may encode keys and an associated error correction code into the selected randomized version of the data sector where the keys indicate numbers used to randomize the selected blocks that form the selected randomized version of the data sector. The grading circuitry may distribute symbols evenly within the selected randomized version of the data sector to encode the keys and the associated error correction code.

DESCRIPTION OF THE DRAWINGS

The same reference number represents the same element on all drawings.

DETAILED DESCRIPTION OF THE INVENTION

Figure 1:
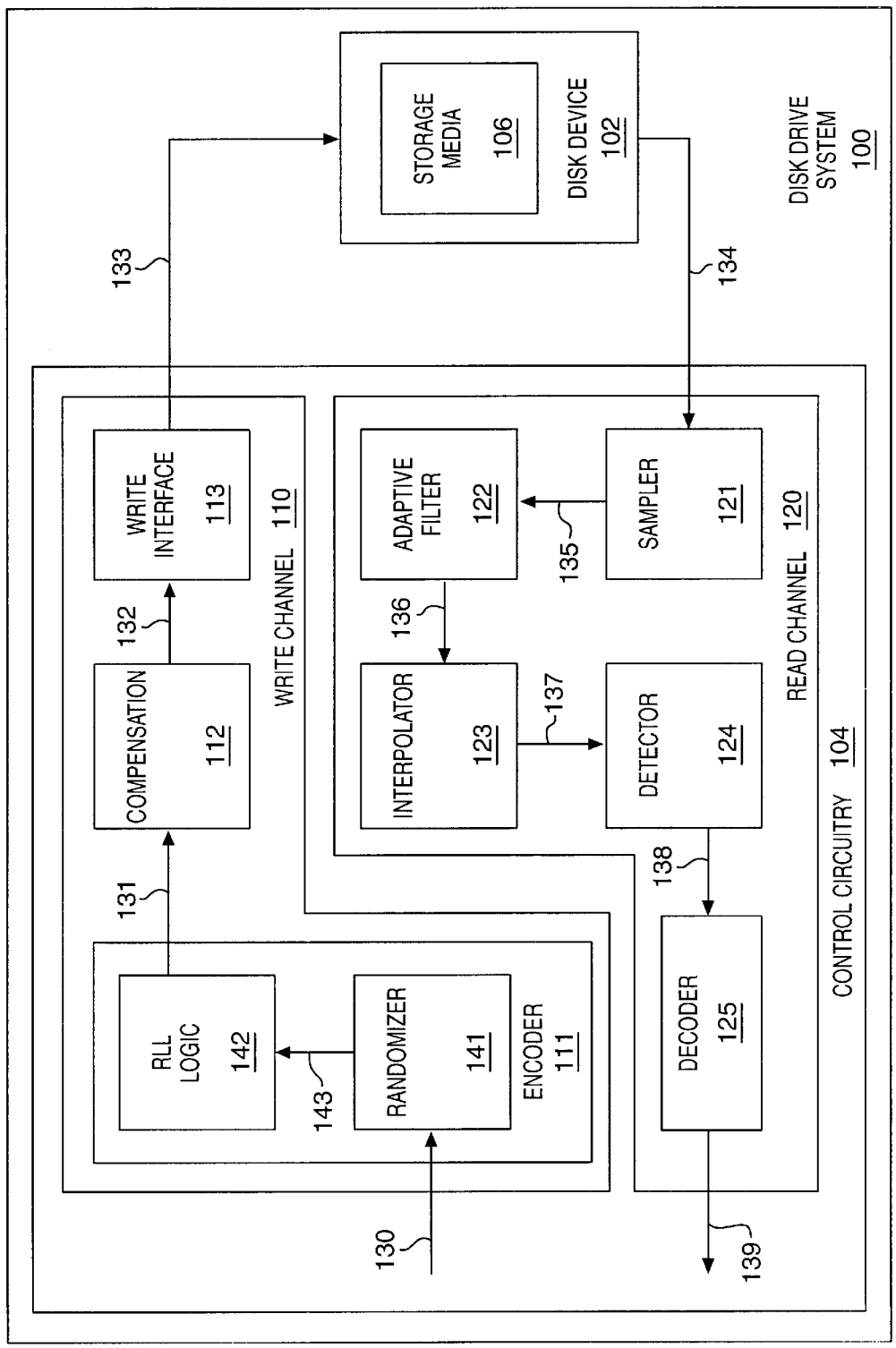
FIG. 1 is a block diagram that illustrates a disk drive system in the prior art.

Prior Art Disk Drive System—FIG. 1

FIG. 1 is a block diagram that illustrates disk drive system 100 in the prior art. Disk drive system 100 includes a disk device 102 and associated control circuitry 104. Disk device 102 includes storage media 106. Some examples of storage media 106 include magnetic disks and optical disks. Control circuitry 104 includes write channel 110 and read channel 120. Write channel 110 includes encoder 111, compensation 112, and write interface 113 connected in series. Encoder 111 comprises randomizer 141 and RLL logic 142. Read channel 120 includes sampler 121, adaptive filter 122, interpolator 123, detector 124, and decoder 125 connected in series. Interface 113 and sampler 121 are coupled to disk device 102.

Data signal 130 carries user data. Write channel 110 receives data signal 130 and transfers a corresponding write signal 133 to disk device 102. Disk device 102 stores the data on storage media 106. Subsequently, disk device 102 reads storage media 106 and transfers a corresponding read signal 134 to read channel 120. Write signal 133 and read signal 134 should both represent the data. Read channel 120 processes read signal 134 to generate data signal 139. Ideally, data signal 139 carries the same user data as data signal 130.

Write channel 110 operates as follows. Randomizer 141 in encoder 111 receives and randomizes data signal 130 to generate randomized signal 143. Randomizer 141 uses an LFSR to generate a repeating numerical pattern, and then, randomizer 141 XORs data signal 130 with the numerical pattern. RLL logic 142 systematically replaces zero runs in randomized data 143 to generate encoded data 131. Encoder 111 may add error-checking information to encoded data 131 for use during decoding. Encoder 111 transfers encoded signal 131 to compensation 112. Compensation 112 adjusts the timing of transitions in encoded signal 131 to generate time-adjusted signal 132. Compensation 112 transfers time-adjusted signal 132 to write interface 113. Interface 113 converts time-adjusted signal 132 from digital to analog to generate write signal 133. Interface 113 transfers write signal 133 to disk device 102.

If storage media 106 is a magnetic disk, then write signal 133 drives a magnetic head that alters a magnetic field to create magnetic transitions on the magnetic disk. These magnetic transitions should represent the data. The magnetic head subsequently detects the magnetic transitions to generate read signal 134. If storage media 106 is an optical disk, then write signal 133 drives a system that creates pits in the surface of the optical disk. The pits are physical transitions that represent the data. An optical head subsequently projects a laser onto the surface of the disk. The optical head detects the reflection of the laser, which is altered by the pits, to generate read signal 134.

The positioning of heads relative to storage media 106 is essential for proper system operation. Servo information is stored on storage media 106 to facilitate this positioning. Read signal 134 includes this servo information. The control circuitry 104 processes the servo information from read signal 134 to control the location of the heads relative to storage media 106.

Read channel 120 operates as follows. Sampler 121 receives and samples read signal 134 to generate read samples 135. Sampler 121 transfers read samples 135 to adaptive filter 122. Adaptive filter 122 removes distortion by shaping read samples 135 to generate equalized samples 136. Adaptive filter 122 transfers equalized samples 136 to interpolator 123. Interpolator 123 synchronizes equalized samples 136 with the clock for detector 124 to generate interpolated samples 137. Interpolator 123 transfers interpolated samples 137 to detector 124. Detector 124 uses a detection algorithm, such as the Viterbi algorithm, to convert interpolated samples 137 into an encoded signal 138 that represents the data. Detector 124 transfers encoded signal 138 to decoder 125. Decoder 125 performs error-checking functions on encoded signal 138. Decoder 125 applies a decoding technique, such as PR4 with a D constraint, to decode RLL encoding in encoded signal 138. Decoder 125 then de-randomizes the RLL-decoded signal to obtain data signal 139. Decoder 125 transfers data signal 139 to control circuitry 104.

Figure 2:
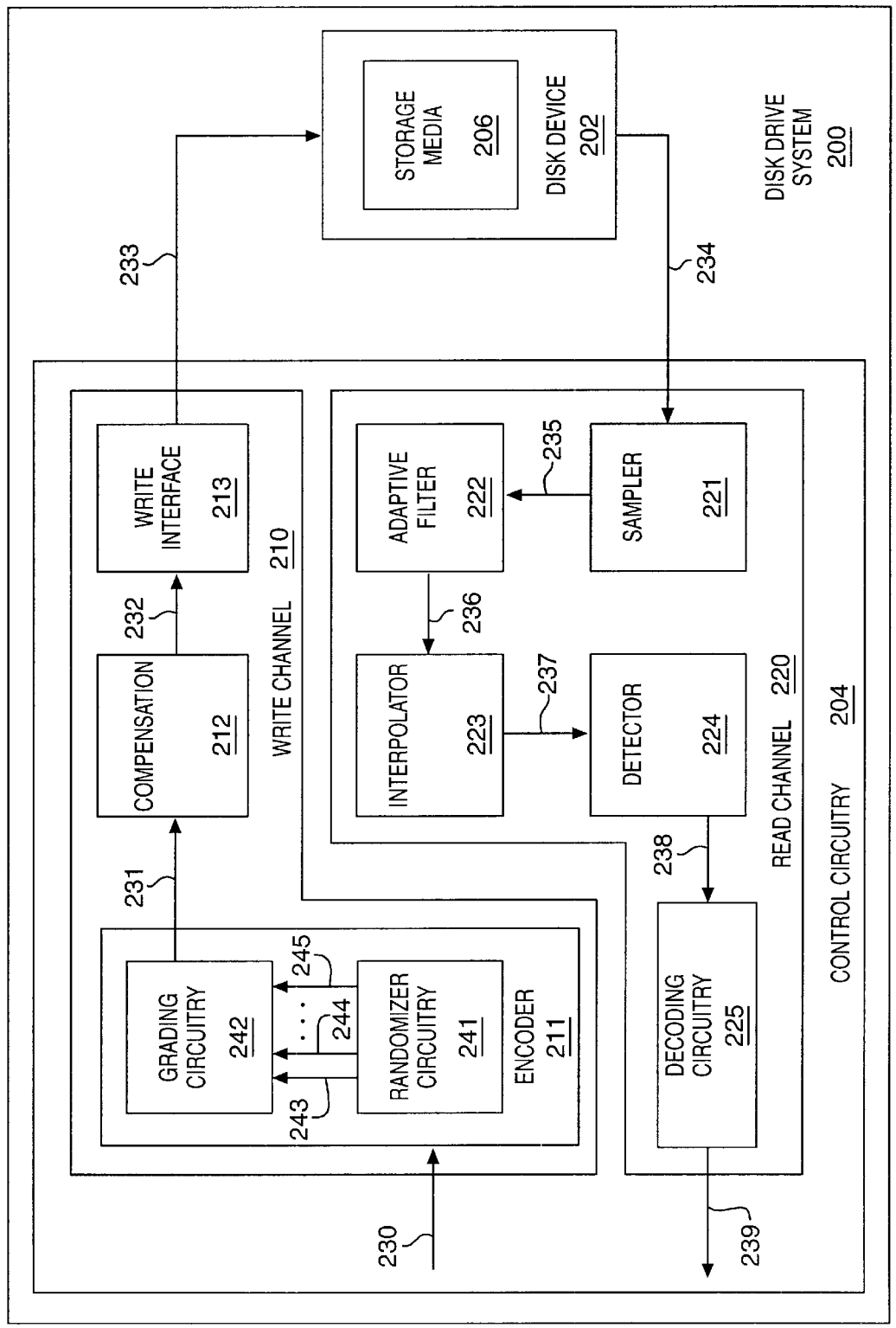
FIG. 2 is a block diagram that illustrates a disk drive system in an example of the invention.

Disk Drive System—FIG. 2

FIG. 2 depicts a specific example of a disk drive system in accord with the present invention. Those skilled in the art will appreciate how the principles illustrated below could be applied to other data storage systems, such as tape drives. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIG. 2 have been simplified or omitted for clarity.

FIG. 2 is a block diagram that illustrates disk drive system 200 in an example of the invention. Disk drive system 200 includes a disk device 202 and associated control circuitry 204. Disk device 202 includes storage media 206. Some examples of storage media 206 include magnetic disks and optical disks. Control circuitry 204 includes write channel 210 and read channel 220. Write channel 210 includes encoder 211, compensation 212, and write interface 213 connected in series. Encoder 211 comprises randomizer circuitry 241 and grading circuitry 242. Read channel 220 includes sampler 221, adaptive filter 222, interpolator 223, detector 224, and decoding circuitry 225 connected in series. Interface 213 and sampler 221 are coupled to disk device 202.

Data signal 230 carries user data. Write channel 210 receives data signal 230 and transfers a corresponding write signal 233 to disk device 202. Disk device 202 stores the data on storage media 206. Subsequently, disk device 202 reads storage media 206 and transfers a corresponding read signal 234 to read channel 220. Write signal 233 and read signal 234 should both represent the data. Read channel 220 processes read signal 234 to generate data signal 239. Ideally, data signal 239 carries the same user data as data signal 230.

Write channel 210 operates as follows. Randomizer circuitry 241 in encoder 211 receives data signal 230. Randomizer circuitry 241 concurrently generates multiple randomized versions 243–245 of the user data in data signal 230. The term "concurrently" means at substantially the same time in the context of data storage signal processing. Randomizer circuitry 241 transfers randomized versions 243–245 to grading circuitry 242. Grading circuitry 242 selects one of the multiple randomized versions 243–245 of the user data for storage on disk device 202. In some examples of the invention, grading circuitry 242 selects the randomized version with the best zero run characteristics. If enough randomized versions 243–245 are generated, then zero-run characteristics may be improved to the point where RLL encoding may be eliminated altogether. Encoder 211 uses the selected one of the versions 243–245 to form encoded signal 231 and adds error-checking information for use during decoding. Encoder 211 transfers encoded signal 231 to compensation 212.

Compensation 212 adjusts the timing of transitions in encoded signal 231 to generate time-adjusted signal 232. Compensation 212 transfers time-adjusted signal 232 to write interface 213. Interface 213 converts time-adjusted signal 232 from digital to analog to generate write signal 233. Interface 213 transfers write signal 233 to disk device 202.

If storage media 206 is a magnetic disk, then write signal 233 drives a magnetic head that alters a magnetic field to create magnetic transitions on the magnetic disk. These magnetic transitions should represent the data. The magnetic head subsequently detects the magnetic transitions to generate read signal 234. If storage media 206 is an optical disk, then write signal 233 drives a system that creates pits in the surface of the optical disk. The pits are physical transitions that represent the data. An optical head subsequently projects a laser onto the surface of the disk. The optical head detects the reflection of the laser, which is altered by the pits, to generate read signal 234.

The positioning of heads relative to storage media 206 is essential for proper system operation. Servo information is stored on storage media 206 to facilitate this positioning. Read signal 234 includes this servo information. The control circuitry 204 processes the servo information from read signal 234 to control the location of the heads relative to storage media 206.

Read channel 220 operates as follows. Sampler 221 receives and samples read signal 234 to generate read samples 235. Sampler 221 transfers read samples 235 to adaptive filter 222. Adaptive filter 222 removes distortion by shaping read samples 235 to generate equalized samples 236. Adaptive filter 222 transfers equalized samples 236 to interpolator 223. Interpolator 223 synchronizes equalized samples 236 with the clock for detector 224 to generate interpolated samples 237. Interpolator 223 transfers interpolated samples 237 to detector 224. Detector 224 uses a detection algorithm, such as a Viterbi state machine, to convert interpolated samples 237 into an encoded signal 238 that represents the data. Detector 224 transfers encoded signal 238 to decoding circuitry 225. Decoding circuitry 225 performs error-checking functions on encoded signal 238. Decoding circuitry 225 applies a decoding technique, such as PR4 with a D=0 constraint, to decode encoded signal 238. Decoding circuitry 225 then de-randomizes the decoded signal to obtain data signal 239. Decoding circuitry 225 transfers data signal 239 to control circuitry 204.

Advantageously, prior art RLL logic 142 from FIG. 1 is not included on FIG. 2. Although RLL encoding may be used in some examples of the invention, it may be eliminated altogether in other examples of the invention. Thus, the bandwidth used to carry RLL overhead information is saved to increase the capacity of disk drive system 200 over prior art disk drive system 100. The novel technology that eliminates RLL encoding from data storage systems is described below in further detail.

Figure 3:
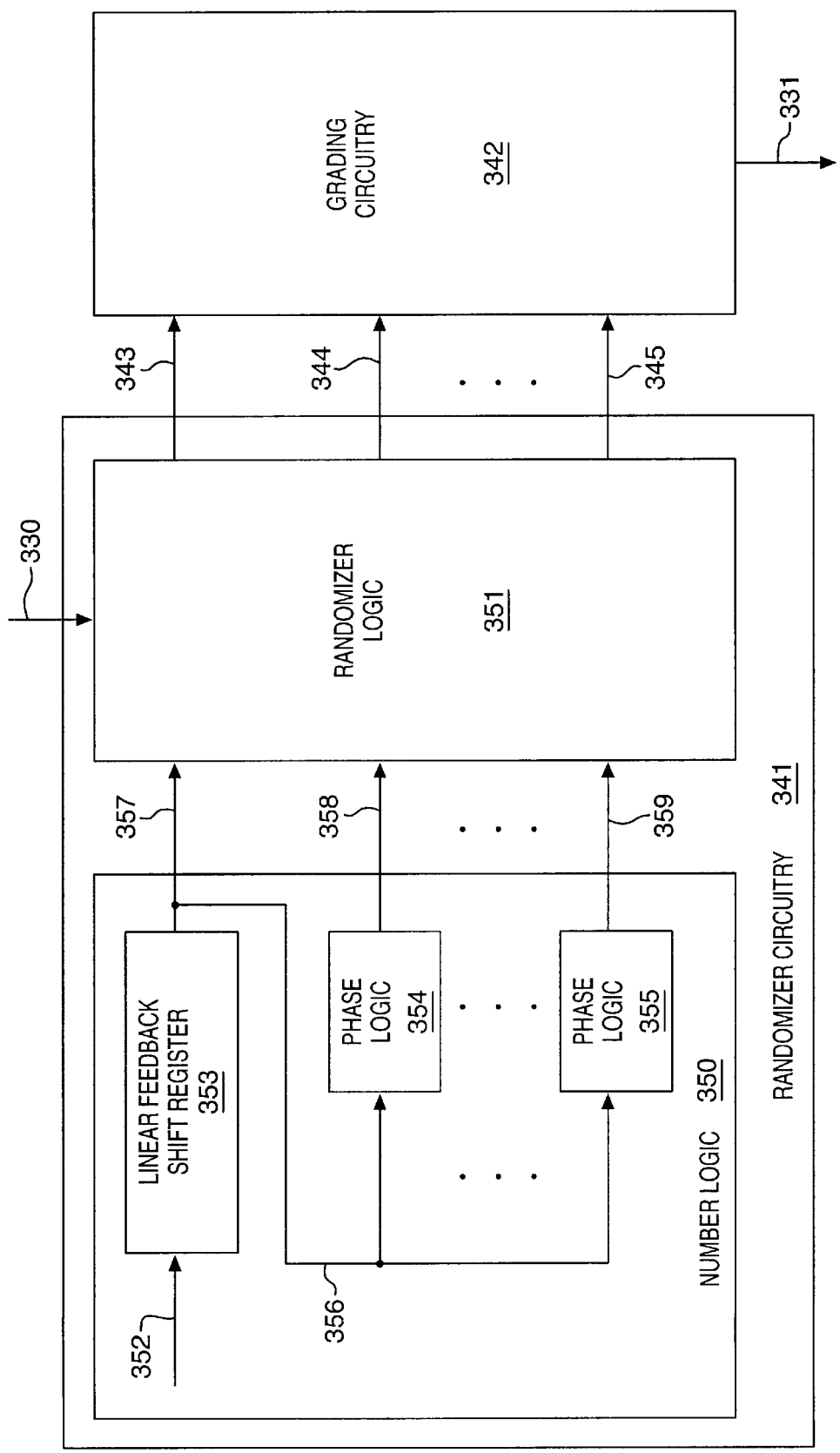
FIG. 3 is a block diagram that illustrates randomizer circuitry in an example of the invention.
Figure 4:
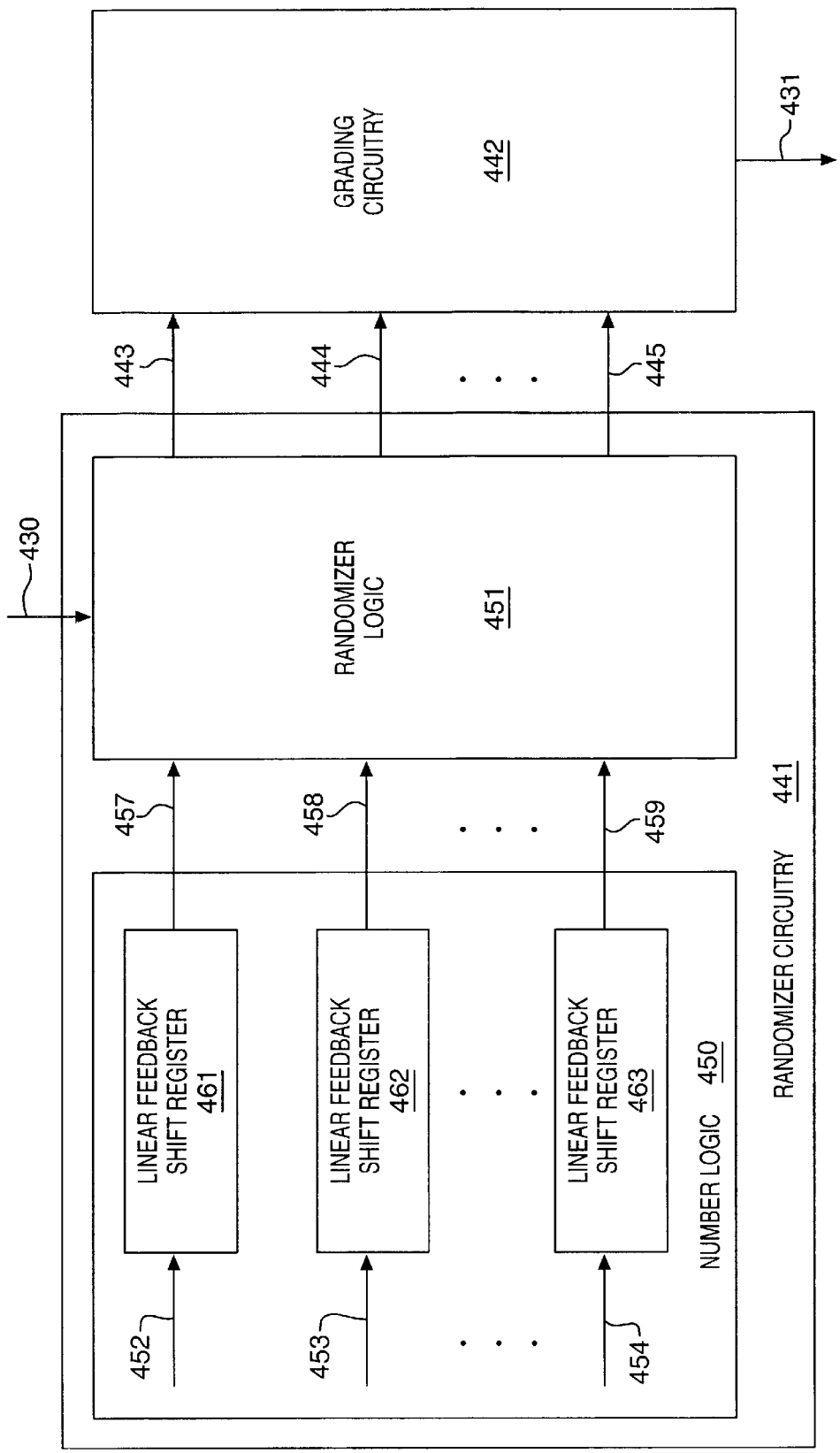
FIG. 4 is a block diagram that illustrates randomizer circuitry in an example of the invention.

Randomizer Circuitry—FIGS. 3–4

FIGS. 3–4 depict specific examples of randomizer circuitry in accord with the present invention. The randomizer circuitry could be used with data storage systems, such as disk drives or tape drives. Those skilled in the art will appreciate numerous variations from these examples that do not depart from the scope of the invention. Those skilled in the art will also appreciate that various features could be combined to form multiple variations of the invention. Those skilled in the art will appreciate that some conventional aspects of FIGS. 3–4 have been simplified or omitted for clarity.

FIG. 3 is a block diagram that illustrates randomizer circuitry 341 in an example of the invention. Randomizer circuitry 341 comprises number logic 350 and randomizer logic 351. Number logic 350 comprises LFSR 353 and phase logic 354–355. LFSR 353 produces a repeating numerical pattern based on its initial seed value 352. For example, an LFSR starting with a 12 bit seed can produce a repeating numerical pattern that is 4095 bits in length.

Phase logic 354–355 is configured to generate different phases of the repeating numerical pattern where each phase is the same repeating pattern, but starting at a different bit in the pattern. For example, LFSR 353 may generate the first phase that starts at the first bit in the pattern. The tenth phase is the same repeating pattern, but starting at the tenth bit in the pattern. If 128 phases are used, then phase logic 355 produces the same repeating pattern, but starting at the $128^{th}$ bit, to generate phase 128.

Thus, number logic 350 concurrently generates different bit sequences that represent the different phases of the repeating numerical pattern. Number signals 357–359 respectively carry these different phases. The bits sequences carried by number signals 357–359 respectively form the numbers that are used for randomization.

Typically, randomization entails performing an XOR operation with user data 330 and the different numbers in number signals 357–359. Each number has a bit length equal to the length of user data 330. For example, user data 330 that is comprised of 1,500 bits is concurrently randomized with numbers that are 1,500 bits. Randomizer logic 351 uses a number from number signal 357 to randomize user data 330 to generate a randomized version 343 of the user data 330. Randomizer logic 351 uses a number from number signal 358 to randomize user data 330 to generate a randomized version 344 of the user data 330. Randomizer logic 351 uses a number from number signal 359 to randomize user data 330 to generate a randomized version 345 of the user data 330. Thus, randomizer logic 351 concurrently generates randomized versions 343–345 of user data 330 based on concurrently-generated numbers from signals 357–359.

Grading circuitry 342 processes each one of the versions 343–345 to assess zero-run characteristics. Typically, grading detects the longest zero-run in each version. Grading circuitry 342 then selects the one of the versions 343–345 with the best grade, such as the version having a longest zero-run that is the shortest among all versions. Grading circuitry 342 transfers the selected version 331 along with a key for the selected version 331. The key indicates the phase of the repeating pattern that was used for randomization. The decoder uses the key in a reciprocal fashion to de-randomizes user data 330.

The zero-run characteristics of the selected version 331 are improved by increasing the number of versions 343–345 that are generated and graded. The number of versions 343–345 are increased by increasing the number of signals 357–359 that are generated. The zero-run characteristics may be improved to the point where RLL encoding can be eliminated.

FIG. 4 is a block diagram that illustrates randomizer circuitry 441 in an example of the invention. Randomizer circuitry 441 comprises number logic 450 and randomizer logic 451. Number logic 450 comprises LFSRs 461–463 that respectively produce repeating numerical patterns in signals 457–459 that are based on their respective initial seed values 452–454. Thus, number logic 450 concurrently generates number signals 457–459 that represent repeating numerical patterns. The patterns may be different or may be different phases of the same pattern. Randomizer logic 451 operates as described above to generate randomized versions 443–445 of user data 430. Grading logic 442 operates as described above to produce selected randomized version 431 of user data 430.

Figure 5:
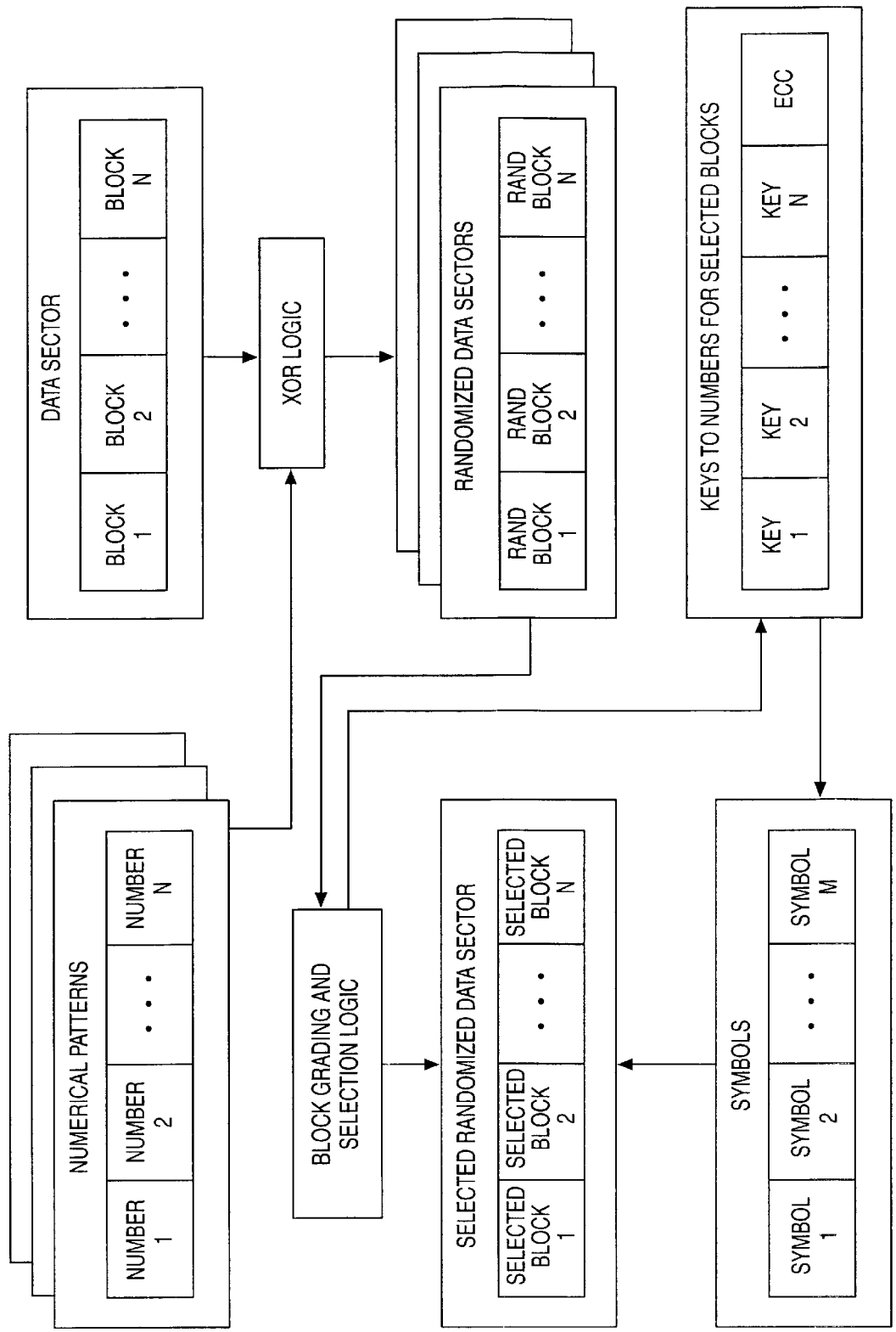
FIG. 5 is a schematic diagram that illustrates randomizer encoding in an example of the invention.

Randomizer Encoding—FIG. 5

FIG. 5 depicts a specific example of randomizer encoding in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIG. 5 have been simplified or omitted for clarity.

FIG. 5 is a schematic diagram that illustrates randomizer encoding in an example of the invention. At the top right of FIG. 5, a data sector of user data is separated into blocks 1–N where N is three in some cases. At the top left of FIG. 5, numerical patterns are generated that include numbers 1–N where each number has a bit-length of one block. The blocks 1–N are respectively XOR'd with the numbers 1–N from each of the numerical patterns to respectively generate randomized data sectors comprised of randomized blocks 1–N. The randomized blocks 1–N are graded, and blocks with the best grades are selected to form a selected randomized data sector comprised of selected blocks 1–N.

Keys to the numbers 1–N for the selected blocks 1–N are generated along with an Error Correction Code (ECC) for the keys. One example of an ECC is a Reed-Solomon code. Note the advantage over RLL encoding where the RLL flag is not protected by an ECC. The keys may indicate the phases of the repeating pattern that were used to randomize the selected blocks 1–N. In some cases, the keys use seven bits that can identify 128 different phases. The keys 1–N and the ECC are then converted into symbols 1–M, and in some cases, each symbol is four bits. The symbols 1–M are then distributed within the selected randomized data sector. The distribution could be an even distribution where the symbols are separated by approximately the same amount of randomized user data. The selected randomized data sector and the symbols are subsequently stored on storage media.

Decoding is achieved by reversing the process of FIG. 5. When the selected randomized data sector is subsequently retrieved from the storage media, the symbols 1–M are extracted to recover the keys 1–N and the ECC. The keys 1–N are checked against the ECC, corrected if necessary, and used to derive the respective numbers 1–N. The numbers 1–N are used to de-randomize selected blocks 1–N to recover the de-randomized data sector.

The above-described circuitry may include a processor and may also include storage media that stores instructions that are retrieved and executed by the processor. Some examples of instructions are software and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. For example, non-linear feedback shift registers may be used. As a result, the invention is not limited to the specific examples and illustrations discussed above, but only by the following claims and their equivalents.

What is claimed is:

1. Data storage system circuitry comprising:
   randomizer circuitry configured to concurrently generate multiple randomized versions of user data; and
   grading circuitry configured to select one of the multiple randomized versions of the user data for data storage.

2. The data storage system circuitry of claim 1 wherein the grading circuitry is configured to select the selected randomized version of the user data based on zero run characteristics.

3. The data storage system circuitry of claim 2 wherein the randomizer circuitry is configured to concurrently generate multiple numbers and use the multiple numbers to concurrently generate the multiple randomized versions of the user data.

4. The data storage system circuitry of claim 3 wherein the randomizer circuitry comprises a feedback shift register that generates a numerical pattern and phase circuitry that concurrently generates different phases of the numerical pattern to concurrently generate the multiple numbers.

5. The data storage system circuitry of claim 3 wherein the grading circuitry is configured to encode a key and an associated error correction code into the selected randomized version of the user data, wherein the key indicates one of the numbers used to randomize the selected randomized version of the user data.

6. The data storage system circuitry of claim 1 wherein the user data is not encoded with a run length limit algorithm.

7. The data storage system circuitry of claim 1 further comprising decoding circuitry configured to decode the selected randomized version of the user data.

8. Disk drive system circuitry wherein a data sector is comprised of blocks, the disk drive system circuitry comprising:
   randomizer circuitry configured to generate multiple randomized versions of each of the blocks in the data sector; and
   grading circuitry configured to select from the randomized versions of the blocks based on zero run characteristics to form a selected randomized version of the data sector.

9. The disk drive circuitry of claim 8 wherein the grading circuitry is configured to encode keys and an associated error correction code into the selected randomized version of the data sector, wherein the keys indicate numbers used to randomize the selected blocks that form the selected randomized version of the data sector.

10. The disk drive circuitry of claim 9 wherein the grading circuitry is configured to distribute symbols evenly within the selected randomized version of the data sector to encode the keys and the associated error correction code.

11. The disk drive circuitry of claim 10 wherein the randomizer circuitry is configured to generate at least 128 of the randomized versions of each of the blocks in the data sector.

12. The disk drive circuitry of claim 10 wherein the data sector comprises three of the blocks.

13. A method of operating data storage system circuitry, the method comprising:
   concurrently generating multiple randomized versions of user data; and
   selecting one of the multiple randomized versions of the user data for data storage.

14. The method of claim 13 wherein selecting the selected randomized version of the user data comprises selecting based on zero run characteristics.

15. The method of claim 14 wherein concurrently generating the multiple randomized versions of the user data comprises concurrently generating multiple numbers and using the multiple numbers to concurrently generate the multiple randomized versions of the user data.

16. The method of claim 15 wherein concurrently generating the multiple numbers comprises generating a numerical pattern and concurrently generating different phases of the numerical pattern.

17. The method of claim 15 further comprising encoding a key and an associated error correction code into the selected randomized version of the user data, wherein the key indicates one of the numbers used to randomize the selected randomized version of the user data.

18. The method of claim 13 wherein the user data is not encoded with a run length limit algorithm.

19. The method of claim 13 further comprising decoding the selected randomized version of the user data.

20. A method of operating disk drive system circuitry wherein a data sector is comprised of blocks, the method comprising:

generating multiple randomized versions of each of the blocks in the data sector; and selecting from the randomized versions of the blocks based on zero run characteristics to form a selected randomized version of the data sector.

21. The method of claim 20 further comprising encoding keys and an associated error correction code into the selected randomized version of the data sector wherein the keys indicate numbers used to randomize the selected blocks that form the selected randomized version of the data sector.

22. The method of claim 21 wherein encoding the keys and the associated error correction code comprises distributing symbols evenly within the selected randomized version of the data sector.

23. The method of claim 22 wherein generating the multiple randomized versions of the blocks comprises generating at least 128 of the randomized versions of each of the blocks in the data sector.

24. The method of claim 22 wherein the data sector comprises three of the blocks.

* * * * *